Patented Sept. 19, 1950

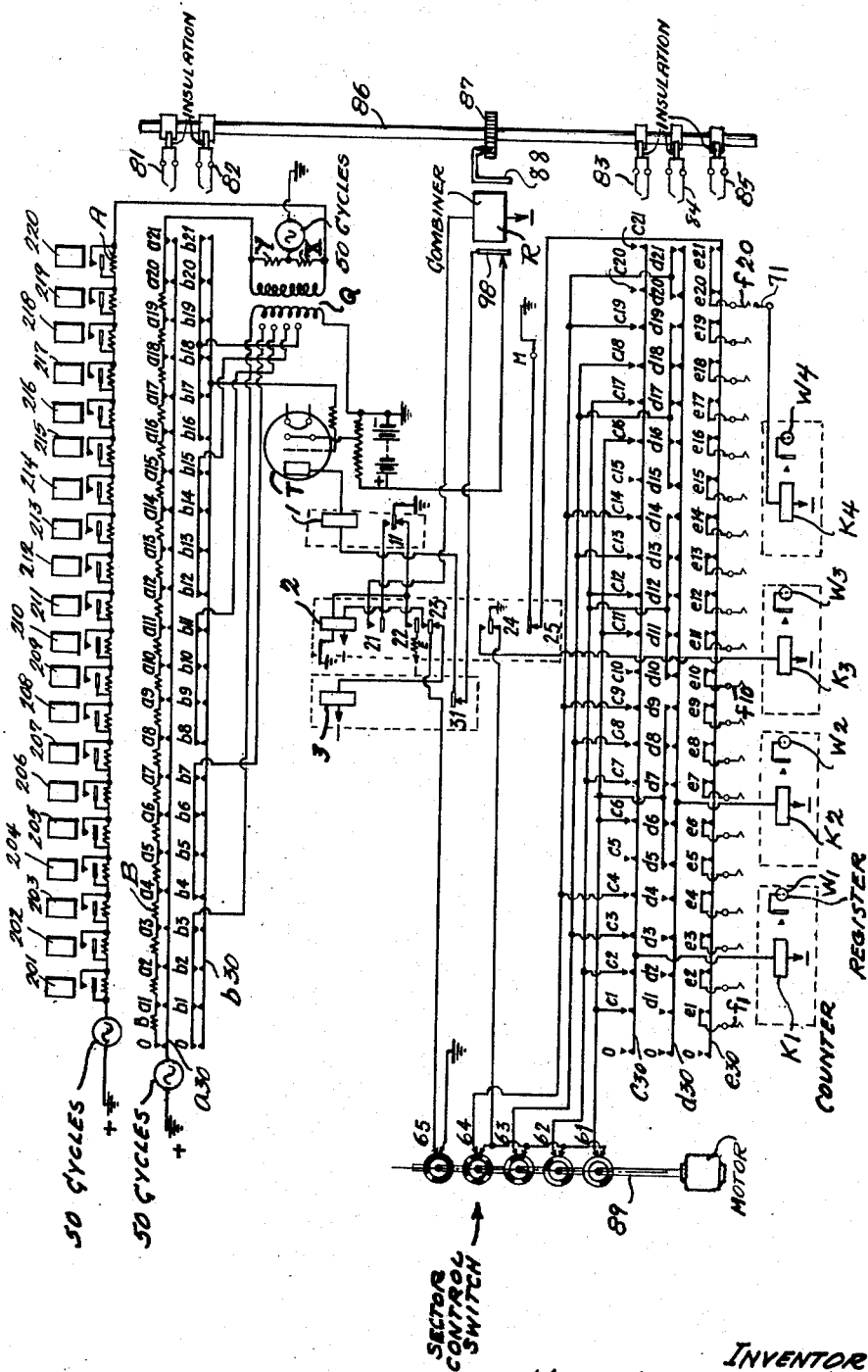

2,522,758

UNITED STATES PATENT OFFICE 2,522,758

REMOTE MULTIPLE OBSERVATION BRIDGE SYSTEM, ESPECIALLY FOR OBSERVING TELEPHONE TRAFFIC

Henri Louis Lesigne, Paris, France

Application November 8, 1946, Serial No. 708,554
In France May 25, 1945

Section 1, Public Law 690, August 8, 1946
Patent expires May 25, 1965

5 Claims. (Cl. 177—353)

The present invention relates to the observation from a distance of the position of a member or a series of members and is applicable more particularly, though not exclusively, to the observation and checking of the traffic in telephone systems. It has for its object to provide an arrangement permitting of ascertaining at each instant the position of a distant or inaccessible prime member by observation of an indicating reference member which is displaced in correspondence with the movements of the member to be observed and checked.

The arrangement according to the present invention is characterised by the fact that it comprises an indicating member associated with an impedance the value of which is characteristic of the position of this indicating member, and that on the other hand the prime member of which it is desired to know the position is associated in the same manner with a second impedance of the same nature as the first, these two impedances being connected through the medium of a device which causes the displacement of the indicating member until the two impedances balance, so that this indicating member stops in a position which is characteristic of the position of the prime member to be checked, the connection of this last member with the rest of the system being provided for by two conductors only.

In a preferred form of the arrangement in accordance with the present invention, the characteristics of the electric circuits utilised are selected in such manner that their balance may be observed by means of a bridge which may have equal arms or not; for example: resistance, capacity, inductance, and so on. A mechanical or electronic relay for example a vacuum tube or a thyratron, is then inserted, after interposing an amplifier if desired, in one of the diagonals of the bridge and controls the indicating reference member which acts in turn on the electric circuit which is associated therewith.

The sole figure of the accompanying drawings illustrates by way of example to which the invention is not limited a circuit diagram of, the application of the arrangement according to the invention, to the checking of the traffic in any stage whatever of selection of an automatic telephone system.

The arrangement shown permits:

1. Of counting at definite intervals the number of the members of the stage engaged at a given instant.
2. Of counting the traffic passed by this stage during a given interval of time.
3. Of counting how many times a certain number of members have been engaged during a given time.

The combination of these three observed quantities permits obtaining all the conclusions needed regarding the operation of the system as well as regarding the average load and the peak load of a particular group of definite members.

The arrangement described has the advantage of being of a unique type capable of being connected, successively and without modification to all the members which it is desired to check or observe, without this connection necessitating modifications of the circuits of the said members.

Referring to the drawing, the first electric circuit is constituted by a chain of equal prime resistances A connected in series associated with each of the prime members to be checked and short circuited by a relay, as $201$, of the series of relays $201$–$220$ when the corresponding prime member is engaged. The total resistance of the chain at a given instant is thus characteristic of the number of prime members engaged at this instant.

All the groups of prime members at any stage of selection may be provided with such a chain terminating at a connection to which it is sufficient to connect the counting device to effect the control of the corresponding group.

The electric reference or comparison circuit is constituted by a chain of equal resistances B, each of these resistances being inserted between the contacts of the bank $a1$ to $a21$ of a rotary switch R acting as a combiner. This rotary switch R comprises four other banks $b1$ to $b21$, $c1$ to $c21$, $d1$ to $d21$, $e1$ to $e21$, the action of which will appear from the following description, and also has an actuating stepping magnet $98$.

A Wheatstone bridge is constituted by the two chains of resistances A and B and two bridge heads X and Y designed in such manner as to balance the bridge under the best conditions of sensitivity when the two chains A and B have all of their resistances connected in. It is supplied at one of its diagonals by the 50 cycle commercial alternating current of the available commercial supply, and comprises in the other diagonal a step-up transformer. Thus, alternating current is applied between ground and the left end of the chain B, as well as the left end of chain A. Alternating current is also applied between ground and the mid-point between two equal resistors X and Y connected across the primary of the transformer.

The secondary of this transformer Q is inserted in the grid circuit of a tube T having three electrodes preferably a gas tube, and is connected on the other hand to a resistance placed in parallel with the battery which supplies the anode current of tube T.

So long as the elements of the combiner R do not occupy a position corresponding to the number of members engaged of chain A, it does not short-circuit on its bank $a$ a number of resistances B equal to the number of resistances A short-circuited by the prime members engaged. The Wheatstone bridge is thus unbalanced and there exists at the terminals of the transformer Q an alternating difference of potential, the positive component of which triggers the plate current which is then maintained in spite of the variations of potential of the grid.

The ratio of transformation of the transformer Q is adjustable in such manner as to permit of adapting the sensitivity of the bridge to the relative influence of the unbalances. This ratio is a maximum when the total resistance of the chain is large since the relative influence of the short circuiting of a resistance is then slight; it is on the other hand a minimum when the resistance is low. This adjustment is effected by the brush of the bank $b$ of the combiner R which puts in circuit respectively several tap connections or taps which are distributed over the secondary.

The relay 1 has controlled contact 11, the relay 2 has controlled contacts 21, 22, 23, 24, 25, and the relay 3 has controlled contact 31.

The plate current of the tube T causes the relay 1 to close over the following path.

Plate of tube T, winding of relay 1, contact 31 of relay 3 not energized, plate voltage +48.

By its contact 11 in energized position the relay 1 excites the relay 2 which is held by its upper winding, contact 22 in energized position of relay 2, resistance E and battery.

By the contact 11 in energized position of relay 1 and contact 21 of the relay 2, the winding of the magnet of the combiner R, battery, the rotary switch is set in operation and through its contact breaker 98 opens the plate circuit; the relay 1 becomes deenergized, the combiner R is tripped and its brush shaft 86 advances by one step by the action of pawl 88 and ratchet 87, which rotates shaft 86, and short-circuits by brush 81 an additional resistance on its bank $a$. If the unbalance of the bridge continues the tube T is again made conductive and through the same circuit the combiner R advances a further step; the relay 2 short circuited for a moment remains in closed position.

When the combiner R reaches the position corresponding to the number of members engaged, the difference of potential across the transformer secondary is nil, the tube is no longer made conductive, the relay 2 becomes deenergized and releases, being slowly short circuited for a relatively long time over the circuit: earth, contact 11 in unenergized position of the relay 1, upper winding of the relay 2 and earth. Brush 82, mounted on shaft 86 in the same azimuth as brush 81, is driven by the shaft 86 and connects two contact studs of the same azimuth of the double row bank comprising contact stubs $b1$ to $b21$ and bus $b30$.

The tube used is advantageously a triode with gaseous atmosphere, of the thyratron type. It is known that in this type of tube, once an anode current has started to flow, the variations of grid voltage have no influence on it and that in order to stop it, it is necessary to open the plate circuit.

These conditions of operation are exactly those under which the tube operates in the arrangement according to the present invention; the grid voltage which is proportional to the difference of potential across the primary of the transformer is in fact variable as a function of the displacement or spacing of the brush of the combiner R with respect to the position to be reached and moreover, extinction and disconnection through making the tube non-conducting is effected by opening the plate circuit by the contact breaker 98 of the electro magnet of the combiner R.

The counting referred to previously is effected by four counter relays.

The counters $K_1$ and $K_2$ connected respectively to the bus $c30$ and bus $d30$ of the combiner R provide for the counting of the number of members engaged, counting being carried out in a system of numeration having the base 5 as determined by the connections of banks $c$, $d$, $e$. The operation of the counters is provided by a series of four cams 61, 62, 63, 64, which at definite intervals of time, send respectively 1, 2, 3 or 4 impulses by the wires 1, 2, 3, 4 through suitable contacts of the combiner R. The cams 61, 62, 63, 64, are mounted on shaft 89 driven by a motor. Brushes 83 and 84, mounted on shaft 86 in the same azimuth as brushes 81 and 82, respectively connect counters $K_1$ and $K_2$ with one of cams 61, 62, 63, 64. The counter $K_3$ actuated by the contact 24 in energized position of the relay 2, marks the number of changes of balance of the device, that is to say twice the traffic passed by the stage.

The counter $K_4$ which may be connected to any selected desired contact stud of the bank $e$ of the combiner R, by plugging the plug 71 into jack $f20$ marks the number of times that the number of members corresponding to the position or rank or order of this selected contact is engaged.

The counters $K_1$, $K_2$, $K_3$, $K_4$, respectively comprise counting wheels $W_1$, $W_2$, $W_3$, $W_4$.

The sending by cams of the counting impulses over the wires 1, 2, 3, 4 is preceded and accompanied by the sending by a fifth cam 65 of a ground connection impulse over the wire 5, which excites the relay 3 and opens the actuating circuit of the relay 1 by the rest contact 31 of the relay 3 in unenergized position, thus maintaining the device unenergized and at rest during the operation of the counters.

If it is desired to observe a group of prime members the number of which is greater than 20, it is sufficient to connect a similar device per each group of 20 and add separately the readings of their counter. The operation of this device necessitates the putting the several banks of the rotary switch, in series, which is effected by the terminal M, provided for this purpose, the terminal M of the last chain being alone connected to earth.

I claim:

1. In a system for exhibiting at a distance the operating conditions of an electrically actuatable system, a plurality of electrical operating members whose condition of engagement or disengagement is to be exhibited, a plurality of primary equal resistances connected in series, individual means actuatable by the condition of engagement of each of said members for short circuiting its corresponding said primary resistor, a rotary switch having a first bank consisting of a plurality of contacts, a stepping magnet adapted to advance the arm of said rotary switch step by step, a plurality of equal balancing resistances connected in series respectively between the contacts of said first bank of said rotary switch, said rotary switch having a first rotary brush actuated by said stepping magnet and adapted to short circuit a variable number of said balancing resistances, a bridge circuit having for its first arm said chain of primary resistances and having for its second arm said chain of balancing resistances and having two adjusting arms adapted to balance the bridge when all of said resistances are actively in circuit, a source of alternating current connected in one diagonal of said bridge, an output circuit connected in the other diagonal of said bridge, a gas discharge tube having a control electrode and a plate and a cathode, means for connecting said output circuit to said control electrode, primary electrically actuatable counter means, an interlocking chain of relays connected to said plate and adapted to apply successive stepping impulses to said stepping magnet as long as said bridge is unbalanced and being further connected and adapted to actuate said primary counter means once upon each rebalancing operation of said bridge.

2. A system according to claim 1, and a cam shaft, a plurality of cams carried on said cam shaft and respectively carrying different numbers of contact segments whose numbers constitute an arithmetical progression, said rotary switch having a second bank of contacts and a second brush therefor operating in synchronism and registration with said first brush, and individual connections from said cams and their contact segments to the individual contacts of said second bank in their numerical order of position in said second bank, and second electrically actuatable counter means connected to said second brush, for counting the number of engaged operating members.

3. A system according to claim 1, and a cam shaft, a plurality of cams carried on said cam shaft and respectively carrying different numbers of contact segments whose numbers constitute an arithmetical progression, said rotary switch having a second bank of contacts and a second brush therefor and individual connections from said cams and their contact segments to the individual contacts of said second bank in their numerical order of position in said second bank, and second electrically actuatable counter means connected to said second brush, for counting the number of engaged operating members, the contacts of said second bank being arranged in successive groups and said connections extending from each of said cams to a contact in each of said groups which has the numerical position in that group corresponding to the number of segments on the cam to which it is connected.

4. A system according to claim 1, and a cam shaft, a plurality of cams carried on said cam shaft and respectively carrying different numbers of contact segments whose numbers constitute an arithmetical progression, said rotary switch having a second bank of contacts and a second brush therefor and individual connections from said cams and their contact segments to the individual contacts of said second bank in their numerical order of position in said second bank, and second electrically actuatable counter means connected to said second brush for counting the number of engaged operating members, and said rotary switch having a third bank of contacts and a third brush therefor, said third brush operating in synchronism and registration with said first and second brushes, said interlocking chain of relays comprising a controlled contact connected to said third brush, and third electrically actuatable counter means connected to a selected one of the contacts of said third bank for counting the number of times of engagement of the position corresponding to said selected contact.

5. A system according to claim 1, and a cam shaft, a plurality of cams carried on said cam shaft and respectively carrying different numbers of contact segments whose numbers constitute an arithmetical progression, said rotary switch having a second bank of contacts and a second brush therefor and individual connections from said cams and their contact segments to the individual contacts of said second bank in their numerical order of position in said second bank, and second electrically actuatable counter means connected to said second brush for counting the number of engaged operating members, and a supplementary cam carried on said cam shaft having a contact segment which is closed only when the contact segments of all of the other said cams are open, said chain of relays comprising relay means connected to said supplementary cam and connected for preventing the operation of said stepping magnet during the period of operation of said counters by the contact segments of said first mentioned cams.

HENRI LOUIS LESIGNE.

REFERENCES CITED

The following references are of record in the file of this patent:

UNITED STATES PATENTS

| Number    | Name     | Date           |
|-----------|----------|----------------|
| 1,391,586 | Slough   | Sept. 20, 1921 |
| 1,736,259 | Gardner  | Nov. 19, 1929  |
| 1,835,737 | Williams | Dec. 8, 1931   |
| 1,952,368 | Gardner  | Mar. 27, 1934  |
| 2,024,275 | Clark    | Dec. 17, 1935  |
| 2,407,286 | Kinkead  | Sept. 10, 1946 |